United States Patent [19]

Doelcher

[11] 3,842,979

[45] Oct. 22, 1974

[54] TABLE TENNIS PADDLE AND BALL RACK

[76] Inventor: Harold S. Doelcher, 16801 Maiden Ln., Granada Hills, Calif. 91344

[22] Filed: Aug. 11, 1972

[21] Appl. No.: 277,677

[52] U.S. Cl. .................................................. 211/14
[51] Int. Cl. ............................................... A47f 7/00
[58] Field of Search ............ 211/13, 14, 15, 65, 41, 211/60 R, 60 T; 273/73 R, 74, 76; 248/111

[56] References Cited
UNITED STATES PATENTS

| 1,893,426 | 1/1933 | Mahoney | 248/111 X |
| 2,221,704 | 11/1940 | Farley | 211/14 X |
| 2,767,854 | 10/1956 | Barrett | 211/13 |
| 3,064,823 | 11/1962 | Shock | 211/13 X |
| 3,497,118 | 2/1970 | Najtar | 211/14 X |

FOREIGN PATENTS OR APPLICATIONS

| 962,004 | 5/1950 | France | 211/13 |

*Primary Examiner*—Marion Parsons, Jr.
*Assistant Examiner*—Thomas J. Holko

[57] ABSTRACT

A table tennis paddle and ball rack including a base adapted for attachment to a table, a wall or the like. The base further includes a pair of ball receptacles, one on each side thereof, these receptacles converging downward to define in combination with the base, retainers for a plurality of table tennis paddles.

6 Claims, 3 Drawing Figures

PATENTED OCT 22 1974        3,842,979

PNEUMATIC TIRES

This is a continuation of application Ser. No. 110,974, filed Jan. 29, 1971, now abandoned.

This invention relates to pneumatic tire and more particularly to motor cycle tire especially those for travelling across soft ground.

In accordance with the invention there is provided a pneumatic tire having a tread comprising a plurality of spaced-apart ground-contacting blocks, the blocks provided at or adjacent the tread crown region having a longer transverse ground-contacting surface dimension edge length or projected length, a shorter circumferential ground-contacting surface dimension edge length or projected length and a greater depth, measured from the ground-contacting surface of the blocks to the local radially outermost surface of the tyre carcass, than the blocks at or closest to the treat shoulder region.

Preferably the blocks are provided in all regions of the tread.

In accordance with a further aspect of the invention there is provided a pneumatic tire having a tread comprising a plurality of spaced-apart ground-contacting blocks the circumferential ground-contacting dimension edge length or projected length of each block, the transverse ground-contacting dimension edge length or projected length of each block and the depth of each block, measured from the ground-contacting surface of the block to the local radially outermost surface of the tire carcass, is respectively longer, shorter and smaller the greater the transverse distance of the axially innermost part of the ground-contacting surface of the block from the mid-circumferential plane of the tire.

Throughout this specification and claims the phrase "axially innermost" means nearest to the mid-circumferential plane of the tire. Conversely the phrase "axially outermost" means furthest from the mid-circumferential plane. "Dimension" means the greatest ground contacting length on a ground contacting block, or projected length thereof, said length or dimension being measured either transverse to (across) the tread, or circumferentially, parallel to the tire circumference.

Preferably the blocks are disposed in staggered arrangement in rows which are transverse or inclined to a tire circumference, the blocks in one row being opposite gaps in the two immediately adjacent rows except at the ends of alternate rows. The transversely-extending grooves formed between transverse rows of blocks are relatively wide so as to provide for adequate sideways clearance of soil picked up by the tread and it is preferred that the width in a circumferential direction of these grooves at any given part thereof is at least as wide as the circumferential ground-contacting surface edge length or projected length of the blocks provided adjacent the given part of the grooves for at least a proportion, preferably a major proportion of the groove length.

Two embodiments of the invention, 4.60 × 18 size racing motor cycle tire suitable for use on soft ground will now be described by way of example with reference to the accompanying drawings of which:

Figure 2:
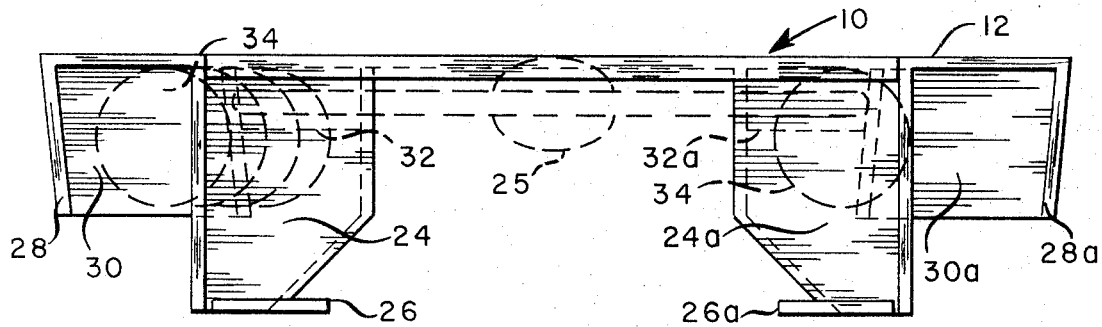
FIG. 2 is a representation of the tread block arrangement of the tire shown in FIG. 1, the block surfaces being shown in a position they would occupy if the surface of the tire without the blocks were flat.
Figure 3:
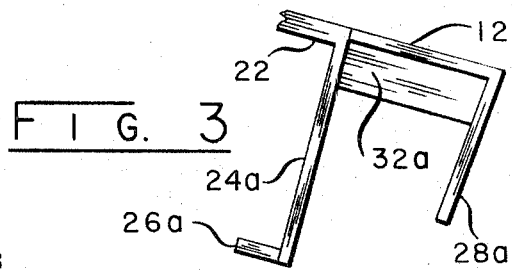
Figure 1:
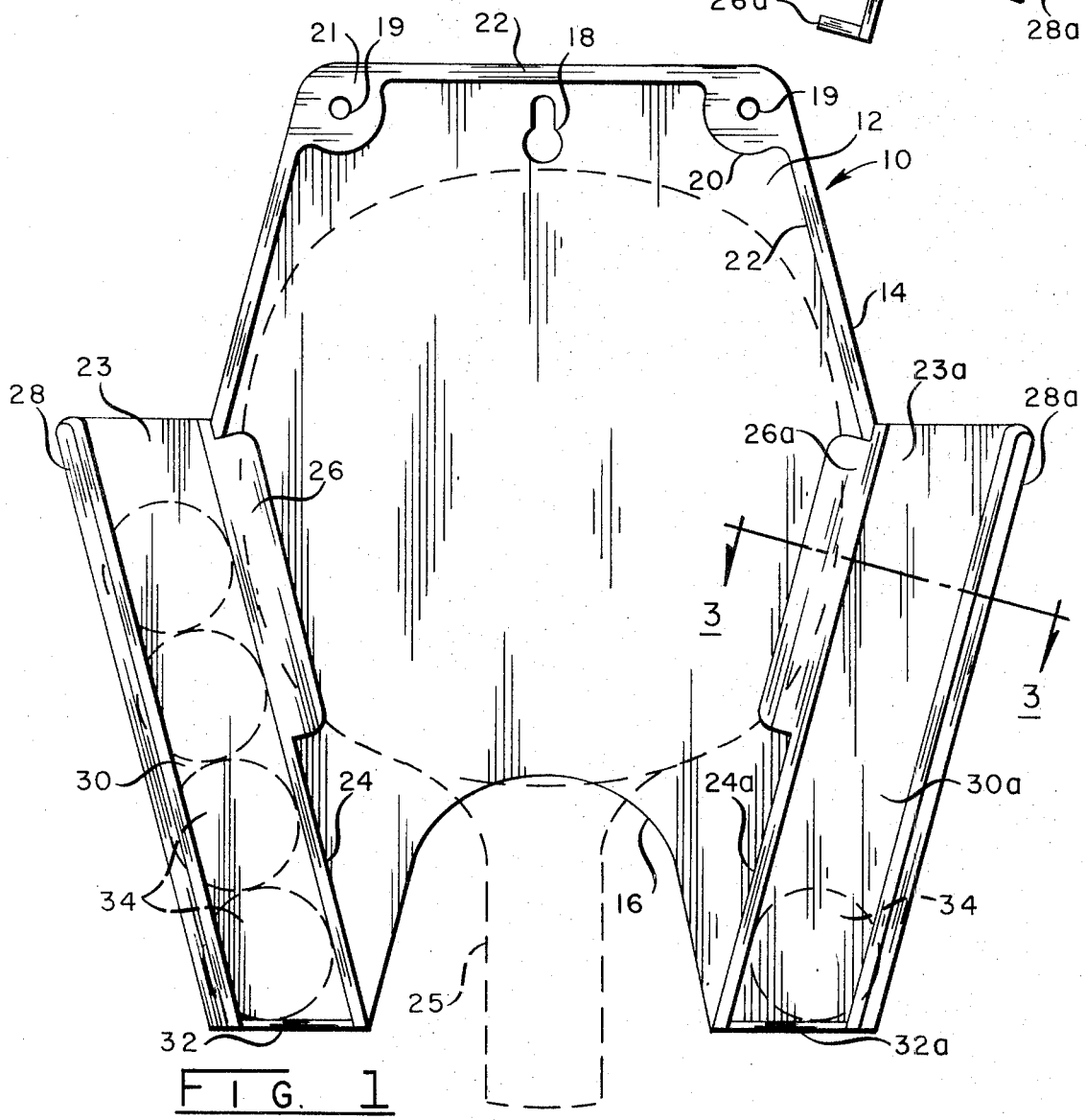
FIG. 1 is an axial cross-section through the tire of the first embodiment.

It is to be noted that while the relative dimensions of the blocks as shown in FIG. 2 are correct, the distances between the blocks, will be distorted. In particular the circumferential spacing between the blocks near the tire shoulder will be reduced on account of the reduced circumference of the tread shoulder compared with the tread crown.

The first tire 1 comprises a tread having a plurality of blocks (A,B,...) each having a rectangular ground-contacting surface 2, two edges of the surface extending circumferentially and the other two transversely, i.e., at right-angles to the circumferential edges. The tire also comprises a layer 3 of under-block rubber of substantially uniform thickness of 4mm. surrounding the radially outermost surface 6 of the tire carcass 7 and extending from one lower sidewall 4 to the other 5.

The blocks are arranged in rows extending transversely of the tread, five blocks A, B, C, D and E to a row, in a staggered arrangement wherein the rows of blocks are displaced alternately towards one side of the tire and the other so that each block is adjacent a gap between blocks in the two immediately adjacent rows except for the block at the laterally outermost end of each row.

Each row of blocks is the same in respect of dimensions and relative locations except that alternate rows are reversed. Thus the blocks nearest one side of the tire tyre are A, E, A, E and on the other are E, A, E, A. Block A is nearer to its associated bead region than is block E.

All blocks are of rectangular form having two circumferentially-extending edges and two transverse edges the lengths of which respectively increase and decrease the further the axially-inner edge of the block is from the mid-circumferential plane of the tire. The center block in each row straddles the tire mid-circumferential plane X—X asymmetrically.

The lengths in millimeters of the sides of the blocks at their ground-contacting surfaces, the distances, also in millimeters their axially inner edges would be from the tire mid-circumferential plane if the surface of the tire with the blocks removed were flattened out and the block depths measured between the center of the block ground-contacting surface and the radially outermost extremity of the under block rubber are given in the Table I below.

TABLE I

| Block | A | B | C | D | E |
|---|---|---|---|---|---|
| Circumferentially-extending edge | 24 | 21 | 20 | 22.5 | 25 |
| Transverse edge | 10.5 | 20 | 24.5 | 17.5 | 10.5 |
| Distance of axially innermost edge from mid-circumferential plane | 58 | 21.5 | 4.5 | 37 | 69.5 |
| Depth | 10 | 12 | 14 | 13 | 11 |

It should be noted that block C, the center block in each row, straddles the mid-circumferential plane and is disposed such that 4.5 mm. of the transverse edge are disposed on one side of the mid-circumferential plane At the lower extremity of each of a pair of channels 30 and 30a defined between these two flange pairs, is a partition or stop 32 and 32a, respectively. Thus, when table tennis balls are positioned in the channels 30 or 30a such as indicated by the broken lines 34, they move downward until engaging the stop 32 or 32a. Since the distance between the outer extremities of the flanges 24 and 28, for example, is smaller than the diameter of the balls, the balls are retained within the channels 30 or 30a and are prevented from being removed therefrom in either an outward direction, by virtue of such dimensions, or in a downward direction, by virtue of the presence of the stops 32 and 32a. Thus, their removal must be accomplished by grasping the balls through the opening of the channels and moving them upward and out of the channels. In the usual instance, the channels 30 and 30a are of a length sufficient to accommodate receipt of four table tennis balls.

It will be recognized that as a function of this configuration the balls may be inserted or removed from the channels readily and conveniently.

While, as noted above, the various flanges, retainers, stops and base member may be fabricated as individual parts and conventionally assembled, it is usually preferable and more economical that they be injection molded as an integral unit, thereby additionally imparting strength to the total rack.

It will be apparent that the rack 10 may be hung in a convenient location, such as upon the side of a table tennis table or a nearby wall, the only attaching member required being a simple screw or nail in the side of the table. Thus, during a game or between games the rack may be maintained in that location, providing an extremely convenient location for the balls and paddles, rather than leaving them strewn about the play area. When it is necessary that the table be folded or moved the rack 10 may be easily removed from its installed position and stored until again needed. If attached to other than the table it may remain in a permanently installed position.

The cutout region 16 of the base 12 is relieved to the extent necessary to accommodate receipt of the table tennis paddle handles. The handles may, of course, be staggered such that they are oriented in an overlapping relationship, the blades of the various paddles being placed essentially flat against one another between the base 12 and the retainers 26 and 26a.

By virtue of the novel structural features described in relation to this table tennis paddle and ball rack, a feature of great convenience is added to equipment accommodations, thereby increasing enjoyment in the game; this in that storage and retrieval of the equipment used is orderly and convenient.

Although this rack configuration has been described in specific terms it will be understood that it may be modified in certain particulars without departing from the novel concept herein encompassed. The scope of the invention is to be limited only by the scope of claims appended hereto.

I claim:

1. A table tennis paddle and ball rack comprising:
a base member,
a pair of ball receptacles converging inward and downward, each comprising a pair of flanges mounted on and extending from said base member, two of said flanges defining cooperatively with said base member a paddle receiving, abutting and retaining means therebetween to support the paddles, and retainer means upon said two flanges and positioned to restrain removal of paddles from between said ball receptacles.

2. The table tennis paddle and ball rack of claim 1 wherein
each of said pair of ball receptacles comprises
a pair of flanges extending outward from said base member in a mutually converging relationship so as to accommodate receipt of table tennis balls therebetween from an upper extremity,
stop means across at least a portion of channels defined between each said pair of flanges being provided to prevent downward removal of such balls.

3. The table tennis paddle and ball rack of claim 2 wherein
an inner and an outer flange is included in
each of said pair of ball receptacles and said retainer means extends inwardly and is positioned upon an outer extremity of each said inner flange to assist in retaining paddles in their racked positions between such flanges and said base member.

4. The table tennis paddle and ball rack of claim 1 wherein
said base member, at its lower extremity and approximately centrally thereof, includes means defining a cutout region adapted to receive at least one table tennis paddle handle in a semi-nested relationship, said pair of ball receptacles converging toward one another in a downward direction and terminating with a distance therebetween sufficient to accommodate the free receipt of a plurality of handles of table tennis paddles.

5. The table tennis paddle and ball rack of claim 4 wherein
each pair of said ball receptacles includes an inner flange additionally defining a portion of said paddle receiving, abutting and retaining means and extending substantially normal to said base member, an outer flange extending from said base member at an acute angle therefrom,
said inner and outer flanges converging to cooperatively define with said base a table tennis ball receptacle, such receptacle being open at its forward extremity and at its top, and
stop means between each said pair of flanges at a lower extremity thereof to prevent downward removal of balls from said receptacle.

6. The table tennis paddle and ball rack of claim 5 wherein
each said inner flange includes a portion of said retainer means comprising a lip-like retainer extending generally inward toward its opposite counterpart from an outer marginal region of said inner flange.

* * * * *